United States Patent [19]

Schwerzel et al.

[11] Patent Number: 5,252,450
[45] Date of Patent: Oct. 12, 1993

[54] CAPPED PHOTOCHROMIC SILVER HALIDES FOR INCORPORATION INTO A PLASTIC MATRIX

[75] Inventors: Robert E. Schwerzel, Columbus; Kevin B. Spahr, Worthington, both of Ohio

[73] Assignee: Battelle Memorial Institute, Columbus, Ohio

[21] Appl. No.: 651,323

[22] Filed: Feb. 6, 1991

[51] Int. Cl.$^5$ .............................................. G03C 1/005
[52] U.S. Cl. .................................. 430/567; 430/569; 430/601; 430/603; 430/611
[58] Field of Search ............... 430/567, 603, 611, 601, 430/569

[56] References Cited

U.S. PATENT DOCUMENTS

| | | | |
|---|---|---|---|
| 3,576,755 | 4/1971 | Patella et al. | 252/300 |
| 3,806,462 | 4/1974 | Bloom | 252/300 |
| 3,875,321 | 4/1975 | Gliemeroth | 428/432 |
| 4,018,807 | 4/1977 | Brooks, Jr. | 260/439 |
| 4,046,586 | 9/1977 | Uhlmann et al. | 106/194 |
| 4,049,567 | 9/1977 | Chu et al. | 252/300 |
| 4,106,861 | 8/1978 | Brewer et al. | 350/354 |
| 4,110,244 | 8/1978 | Hovey | 252/300 |
| 4,122,030 | 10/1978 | Smith et al. | 252/313 |
| 4,431,730 | 2/1984 | Urabe et al. | 430/604 |
| 4,556,605 | 12/1985 | Mogami et al. | 428/331 |
| 4,578,305 | 3/1986 | Postle et al. | 428/212 |
| 4,596,673 | 6/1986 | Beale | 252/586 |
| 4,687,679 | 8/1987 | Beale | 427/38 |
| 4,701,218 | 10/1987 | Barker et al. | 106/114 |
| 4,713,322 | 12/1987 | Bryan et al. | 430/569 |
| 4,714,692 | 12/1987 | Abrevaya et al. | 502/261 |
| 4,913,845 | 4/1990 | Gillberg-LaForce et al. | 252/582 |
| 5,015,416 | 5/1991 | Reid | 430/567 |

FOREIGN PATENT DOCUMENTS

| | | |
|---|---|---|
| 3308186A1 | 9/1983 | Fed. Rep. of Germany . |
| 60136702 | 3/1983 | Japan . |
| 59-214002 | 1/1984 | Japan . |
| 60-125802 | 6/1985 | Japan . |
| 60-262155 | 7/1985 | Japan . |
| 61-93401 | 10/1986 | Japan . |
| 63-64019 | 8/1988 | Japan . |
| 85/00432 | 1/1985 | PCT Int'l Appl. . |
| 89/12839 | 12/1989 | PCT Int'l Appl. . |
| 2144433A | 3/1985 | United Kingdom . |

OTHER PUBLICATIONS

Steigerwald et al.; J. Am. Chem. Soc., 1988, 3046–3050, Surface Derivatization & Isolation of Semiconductor Cluster Molecules.

Primary Examiner—Charles L. Bowers, Jr.
Assistant Examiner—Thorl Chea
Attorney, Agent, or Firm—Watkins, Dunbar & Pollick

[57] ABSTRACT

A photochromic composition for incorporation into a light-transmitting polymer is described. Silver halide crystallites are capped with an organic capping group using multivalent metal ions integrated into the surface of the silver halide crystallite to provide crystallite surface sites that provide a handle between the organic capping group and the silver halide crystallites. The size of the capped silver halide crystallites are less than about 1000 Å. A reverse micelle technique is used to control the size of the silver halide crystallite while integrating the multivalent ions and bonding the organic capping group. The capped crystallites are soluble in organic solvents and, as such, are readily incorporated into a polymer matrix.

25 Claims, No Drawings

CAPPED PHOTOCHROMIC SILVER HALIDES FOR INCORPORATION INTO A PLASTIC MATRIX

FIELD OF THE INVENTION

The present invention relates to photochromic materials and more particularly to capped silver halide photochromic crystallites that are particularly useful for incorporation into polymeric matrices.

BACKGROUND OF THE INVENTION

Various types of photochromic compounds are known for use in light transmitting articles such as lenses, filters, screens, and windows. These photochromic compounds change color on exposure to certain wave lengths of light or other electromagnetic radiation. These photochromic changes are reversible, that is, they change to and from the various colors on exposure to and withdrawal from the activating light radiation. It is known that the general basis of the photochromic reaction is produced by a photochromic substance which contains atoms or molecules capable of switching back and forth between or existing in two distinct energy states. The substances are induced into a higher energy state by absorption of the activating radiant energy which is generally of specific wave lengths defined by the particular materials, usually in the ultraviolet, and, in the absence of the activating radiant energy, return to their inactivated stable states. In the color or activated states, they absorb certain ranges of light energy, and in the inactivated state, the important photochromic materials pass most wave lengths of electromagnetic energy in the visible portion of the spectrum.

Silver halide particles have been found to be a very useful photochromic material and glass has been the preferred matrix for photochromic silver halide particles. The silver halide particles are typically formed in situ in molten glass using high temperature techniques. After the glass has been formed and appropriately annealed to generate photochromic particles, ultraviolet and short wavelength visible light causes the silver halide particles to decompose to elemental silver and halogen atoms Glasses are believed to provide a microscopic environment wherein the halogen atoms remain in close proximity to the elemental silver for recombination after removal of the activating light. In addition, the halogen atoms do not appear to participate in irreversible reactions with other components of the glass so that the halogen remains available for the reverse reaction.

The size and shape of the halide particles may also be important in commercial photochromic products, especially transparent products. If the particles are much bigger than about 1,000 Å, Rayleigh scattering of light occurs to produce a hazy lens that is visually unacceptable.

Where it is intended to incorporate silver halides into a polymeric matrix, the silver halide particles need to be shielded from the chemical effects of the matrix that may have a deactivating effect on the photosensitive particles. The deactivating effect is believed to result in part from the easy oxidation of the silver halide by peroxide initiators, catalysts, and even the polymer matrix itself. Although a number of interesting techniques have been tried in an attempt to duplicate, in photochromic polymers, the performance of silver halide particles in a glass matrix, such attempts apparently have apparently met with little success.

PCT International Patent Application WO 89/12839 to Wasserman, et al. discloses the formation of photochromic polymer membranes that are used on light transmissive materials such as lenses, window glazings, car windshields, camera filters, and the like to control UV and visible radiation and glare.

A silver halide emulsion is formed from solutions of silver ions and halide ions to give silver halide particles that are smaller than about 800 Å using established methods for the preparation of silver halide emulsions for photographic use. A protective environment for controlled silver halide growth is provided by adding a water soluble polymer that does not bind silver or halide ions irreversibly (polyvinyl pyrrolidone, polyvinyl alcohol, polycarboxylic acids, polysulfonic acids, polyethers and co-polymers thereof).

The protective water soluble polymer may be added to the initial halide or silver ion solutions or both or it may be added to the solution of silver halide particles after they have formed. If an initial protective polymer material is used, it is removed during the washing of the silver halide particles. Photoactivating agents such as copper(II), copper(I) or a combination thereof together with sulfur-bearing ions such as $FS^-$, $S_2O_3^=$, or combinations thereof with R being an organic radical are added to the emulsion in a concentration of $10^2$ to $10^5$ parts per million (based on the silver content of the emulsion) to serve as photoactivating agents.

The initial protective polymer is replaced with a higher molecular weight water-soluble polymer that also does not irreversibly bind halogens. The resulting emulsion of surface-activated silver halide in suspension with a suitable polymer can be coated onto suitable substrates such as glass or polymeric light transmissive materials. It is asserted that the polymer must be one that loosely binds halide ion and that a polymer containing at least 50% halogenated groups enhances the reversibility of the silver halide.

U.S. Pat. No. 4,049,567 to Chu, et al. discloses the preparation of polymer matrices, with particular emphasis on polyvinyl pyrolidone and polyvinyl alcohol, containing activated silver halide particles of less than 1,000 Å. Lithium, sodium, potassium, rubidium, cesium, thallium, copper(II), calcium, magnesium, strontium, barium, zinc and beryllium ions can be substituted for up to 50% of the silver ions. Copper(I), iron(II), cadmium and sulfide ions are used as activating ions. The abovementioned polymers act as crystal growth inhibitors. The product requires a plasticizer such as water, glycerine, ethylene glycol, polyethylene glycol, and mixtures thereof to produce an environment suitable for repetitive activation and deactivation of the silver halide particles. It is stated that the polymer must retain the plasticizer to keep its photochromic properties and may be sealed between glass plates to prevent the loss of the plasticizer and hence photochromic activity.

U.S. Pat. No. 4,556,605 to Mogami, et al. discloses a photochromic coating composition for synthetic resin ophthalmic lenses. The coating composition includes an organic silicon compound or its hydrolyzate and silver halide as a photochromic material dispersed therein. A number of Japanese patent applications disclosure similar type organo-silicon materials, for example, JP 59-214002 A, JP 60-125802 A, JP 60-136702 A, and JP 61-93401 A.

U.S. Pat. No. 4,110,244 to Hovey discloses the preparation of a silver halide in transparent polyester materials by first forming a transparent polymer, swelling a surface of the cured polymer with a polar solvent such as methanol, absorbing silver and halide ions into the swelled surface layer and evaporating the solvent to cause the swelled surface layer to collapse, trapping silver halide particles in the surface layer of the plastic.

U.S. Pat. No. 4,046,586 to Uhlmann, et al. discloses the preparation of silver halide in polymer compositions for ophthalmic use. Particles of silver halide, with dimensions between 30 and 10,000 Å and internally doped with $Cu^+$ or other cations are first formed. A coating of a halogen impervious layer of metal oxide such as $Al_2O_3$, $SiO_2$, or $TiO_2$ is formed around the particles allegedly to prevent diffusion of halogen out of the crystal and to render the crystal sufficiently resistent to the plastic host material or components of the host material such as the monomers and peroxides that are used in the polymerization of the host materials.

U.S. Pat. No. 4,106,861 to Brewer, et al. discloses a photochromic protective layer system alleged to be characterized by a reduced haze. Light transmissive articles are formed by evaporating photochromic silver halide onto a plastic coated with a material substantially impermeable to halogens. The silver halide is coated with a layer of metal, such as gold, platinum, palladium or chromium and then laminated to another sheet of plastic coated with a material substantially impermeable to halogens.

U.S. Pat. No. 4,578,305 to Postle, et al. discloses a photochromic assembly in which crushed photochromic glass beads are imbedded in a polymer latex. Other examples of the use of photochromic glass particles include West German patent application DE 3308186 A1, UK patent application GB 2,144,433 A, Japanese patent applications JP 60-262155 A and JP 63-64019 A.

While the photosensitivity of silver halide particles has been found useful in photographic imagings, only an irreversible photo-induced chemical change is sought in silver halide containing photographic materials. Recombination of the elemental silver and halogen in photographic film would lead to destruction of the latent photographic image. Examples of photographic materials are provided in U.S. Pat. No. 4,431,730 to Urabe, et al. and U.S Pat. No. 4,591,328. U.S. Pat. No. 4,713,322 to Bryan et al., describes a photographic silver halide emulsion that contains thioether compounds that improve silver halide crystal growth.

U.S. Pat. No. 4,913,845 to Gillberg-Laforce, et al., illustrates metallic silver colloids dispersed in a composite polymer matrix which materials exhibit a nonlinear optic response.

U.S. Pat. No. 4,714,692 to Abrevaya, et al., discloses a reverse micelle technique for preparing a microemulsion impregnated catalyst composite. Steigerwald, et al., *J. Am. Chem. Soc.*, 1988, 110, 3046–3050 discloses the synthesis of CdSe using an inverse micellar solution with chemical modification of the surface of the cluster compounds by covalent attachment of organic ligends. U.S. Pat. No. 4,122,030 to Smith, et al., pertains to the formation of colloidal dispersions of selenium by a locus control method. U.S. Pat. No. 4,701,218 to Barker, et al., deals with a size stabilizer for ultra fine silver particles (0.5–3,000 nm so that the silver particles can be dispersed for in various materials for use as transparent coloring agents.

U.S. Pat. No. 3,875,321 to Gliemeroth, et al. deals with a fused glassy or crystalline AgBr-CuBr system for use as a reversible phototropic coating applied to glass and plastic substrates.

U.S. Pat. Nos. 4,596,673 and 4,687,679 to Beale disclose a monomer that is codeposited with silver halide particles of 25–150 Å size onto transparent glass or plastic by plasma polymerization or glow discharge polymerization. PCT international application WO 85/00432 to Merle discloses a silver halide photochromic film prepared from a silica or phosphate base material and a silver halide that is subsequently deposited on a plastic article such as a lens by using a vacuum deposition technique. U.S. Pat. No. 4,018,807 to Brooks, Jr. pertains to the synthesis of aromatic sulfur-oxygen transition metal complexes, such as silver or copper, from aromatic hydroxy mercaptans. Some of the complexes such as the nickel and cobalt complexes can be incorporated into plastics for the manufacture of optical products that protect against laser radiation. U.S. Pat. No. 3,806,462 to Bloom relates to plastic optical elements that include a layer having an organometallic complex that is an infrared absorber. The organometallic complexes are formed from transition metal elements such as copper and an aromatic or heterocyclic ring that binds to the metal through oxygen and sulfur linkages. The infrared absorbing complex can be imbibed into transparent plastic sheets. U.S. Pat. No. 3,576,755 to Patella, et al. is drawn to photochromic compositions of an oxygen containing polymer, such as a polycarbonate, and a transition metal complex of various metals, but not including silver or copper.

As apparent from this brief summary, glass has been the most reliable host matrix for photochromic silver halide. However, the major drawbacks to the use of glass as a matrix for photochromic substances are its weight and the high cost of manufacture. Attempts have been made to impart silver halide-based photochromic properties to windows, ophthalmic lenses and other articles made from transparent polymeric materials that are lighter and less expensive to manufacture than glass and that mimic the properties of photochromic glass. However, such attempts have not been particularly successful and typically involve the use of water-soluble polymer matrix material. Other more costly processes involve the use of silicon hydrolyzate materials, molecular organometallic complexes, vacuum deposition or glow discharge polymerization.

SUMMARY OF THE INVENTION

The compounds and process of the present invention solve many of the problems of the prior art by providing a photochromic composition that is soluble in organic solvents and, as a result, readily incorporated into a wide variety of polymeric matrices. The compositions of the present invention have a silver halide core with sufficient multivalent ions on the surface of the crystallite core to bond to an organic capping agent that forms a coating on the individual silver halide crystallites.

The process used in the present invention employs a reverse micelle technique to form colloidal particles of silver halide that are "capped" with a layer of organic material such as an organic sulfide, e.g., thiophenol, that renders the capped silver halide soluble in organic solvents and thus readily incorporable into a polymeric matrix. The process contemplates the use of multivalent ions such as divalent copper ions that serve as handles on the surface of the silver halide crystallites to facilitate bonding of the organic capping material. The capped silver halide crystallites are soluble in various organic solvents and the optically clear solutions made from them are photochromic. The solutions can be co-dissolved in solutions of polymers such as polycarbonates with the optical articles made from the resulting polymer solutions exhibiting photochromic activity.

The photochromic composition of the present invention consists of silver halide crystallites, an organic capping agent or group and multivalent metal ions that are integrated into the surface of the silver halide crystallite. These multivalent metal surface ions are of a sufficient number so as to provide surface sites on the silver halide crystallites that bond to the organic capping group. As a result, the organic capping group forms a capping layer covering each of the silver halide crystallites.

To ensure that the polymeric matrix into which the silver halide crystallites are incorporated is optically clear, the capped silver halide crystallites are of a size that is less than the minimum Raleigh scattering size, typically, less than about 1000 Å and preferably of a size less than about 100 Å.

The silver halide of the present invention can be a chloride, bromide, iodide or a mixture of these ions. The multivalent ion that is incorporated into the surface of the silver halide crystallite is a multivalent ion, preferably a divalent ion such as copper or zinc.

Preferably the organic capping group is of the general formula $R_nY^-$ where Y is a main group VA and main group VIA elements such as oxygen, nitrogen, phosphorous or sulfur, R is an organic group and "n" has a value of 1 or 2 depending upon the valence of the main group VA or VIA elements. R is an organic functionality whose characteristics depend on the intended use of the capped photochromic composition. For example, R can be chosen as to render the capped photochromic composition soluble in various organic solvents that codissolve with a solution of a polymeric material. Thus if R is thiophenol the capped silver halide crystallites have been found to dissolve in chloroform that in turn can be codissolved with a chloroform solution of a polycarbonate to form a photochromic polymeric material. Alternatively R can be chosen so as to react with and become a part of the polymeric matrix. For example, R can be chosen as an ethylenic group that is polymerizable with a suitable comonomer such as styrene or acrylate.

The photochromic compositions of the present invention are formed by using a reverse micelle technique. In this technique, a surfactant such as dioctyl sulfosuccinate is dissolved in an organic solvent such as heptane. Small amounts of aqueous media are added to the organic solvent-surfactant solution to form aqueous pools or cores of water. Such a mixture of aqueous cores, surfactant and organic solvent is referred to as a water-in-hydrocarbon microemulsion liquid medium. Various ions and other reagents may be dissolved in the water cores and then allowed to react by contacting the water cores with each other so as to allow the reagents to migrate across the micelle interface.

For the preparation of silver halide crystallites, two or more water-in-hydrocarbon microemulsion liquid media are used. The first microemulsion contains aqueous silver ions dissolved in the water cores of a metal-containing water-in-hydrocarbon microemulsion liquid medium. Aqueous bromide ions are dissolved in the liquid cores of a second halide-containing water-in-hydrocarbon microemulsion liquid medium. By contacting the aqueous cores of these two microemulsions, the halide and silver ions combine to form silver halide crystallites that remain in the aqueous cores of the water-in-hydrocarbon microemulsion liquid medium.

The process of forming the silver halide crystallites of a size less then the Rayleigh scattering size tends to be sensitive to ion concentration and stirring time. Generally it has been found that by using a greater amount of halide ion than silver ion and by adding the halide ion microemulsion to the silver ion microemulsion, the resulting silver halide crystallites remain within the water cores of the water-in-hydrocarbon microemulsion liquid medium. However, if the silver ion concentration is too high with respect to the bromide concentration or if the silver microemulsion liquid medium is added to the bromide microemulsion liquid medium, the solutions turn cloudy as a result of the formation of large silver halide crystallites that are no longer contained within the aqueous core of the water-in-hydrocarbon microemulsion liquid medium.

To further control and minimize the precipitation of silver halide crystallites from the aqueous cores, it has been found that the silver halide crystallites size can be controlled by vigorous stirring of the halide and silver microemulsions provided that such stirring is carried out for short periods of time, preferably for less than about an hour. Longer stirring times tend to promote the growth of larger crystallites that tend to escape and precipitate from the aqueous cores rendering the microemulsion solution milky and cloudy in color.

The multivalent ions are incorporated onto the surface of the silver halide crystallites using a number of techniques. For example, the multivalent ion can be combined with the silver ion in the aqueous core of the water-in-hydrocarbon microemulsion liquid medium. This may be done by simply mixing or co-dissolving a solution of silver and multivalent metal ions choosing an anion that does not precipitate with the silver or multivalent cation. Another way of incorporating the multivalent metal ion is to form a third water-in-hydrocarbon microemulsion liquid medium whose aqueous cores contain the multivalent metal ions. This third multivalent ion containing water-in-hydrocarbon microemulsion liquid medium is added to the silver ion containing water-in-hydrocarbon microemulsion liquid medium prior to contacting with the halide microemulsion or it may be added while the bromide and silver microemulsions are being contacted with each other but after the silver halide crystallites have begun to form. To insure proper integration of the multivalent ions into the surface of the silver halide crystallites, the multivalent ions are used in a molar concentration that is greater than about 1% of the molar concentration of the silver ions.

After the silver halide crystallites have formed with the multivalent metal ions on their surfaces and while the silver halide crystallites are still contained within the aqueous cores of the water-in-hydrocarbon microemulsion liquid medium, a hydrocarbon solution of an organic capping agent is added so as to bond to the multivalent metal ions integrated into the surface of the silver halide crystallites. With the addition of the organic capping agent, the capped silver halide crystallites precipitate from the aqueous cores of the water-in-hydrocarbon microemulsion liquid medium so as to leave the solution milky or turbid.

The capped silver halide crystallites can then be separated from the water-in-hydrocarbon microemulsion liquid medium by centrifugation. The supernatant liquid is decanted and the remaining precipitate is washed several times with a solvent and dried to give a free flowing powder.

To purify further the free flowing powder of capped silver halide crystallites, the material is dissolved in an appropriate solvent such as pyridine and then filtered to remove any insoluble solid matter. The solvent is removed to give a free flowing powder. Preferably the dissolution step is carried out for up to 72 hours.

The free flowing capped silver halide crystallite can be dissolved in a variety of organic solvents such as chloroform, methylene chloride, tetrachloroethylene, pyridine and mixtures thereof. The resulting solutions can be co-dissolved with a polymer, such as a polycarbonate polymer, to give a photochromic light-transmitting polymer composition. These compositions can be cast as films, lenses, window panes and similar items.

DETAILED DESCRIPTION OF THE INVENTION AND BEST MODE FOR CARRYING OUT THE PREFERRED EMBODIMENT

The present invention is particularly embodied in a material comprising a silver halide crystallite that is capped with an organic group that is bonded to the silver halide crystallite by means of multivalent metal ions that are integrated into the surface of the silver halide crystallite and the method for making the same, such material being particularly useful in forming light-transmissive polymeric bulk and sheet materials.

The silver halide crystallites may be formed as a single halide selected from a group of silver halides consisting of silver halide, silver bromide and silver iodide or they may be formed as mixed halides. It is contemplated that the silver halide particles may be relatively homogeneous or that the particles can be varied so that the central region may be of a different silver halide composition than the laterally surrounding region. For example, the particles may be formed with a silver iodide core surrounded by a mixed silver chloride/silver bromide shell or alternatively the particles may be formed with a silver chloride/silver bromide core surrounded by a silver iodide shell. Of course other combinations of silver halide ions may be used in a variety of silver halide core-shell structures.

In order to achieve good bonding of a capping agent to the silver halide crystallites, multivalent metal ion are integrated into the surface of the silver halide crystallite to serve as "handles" by which the organic capping agent is bound to the silver halide crystallites.

The surface integration of multivalent ions into the surface of the silver halide crystallites may be accomplished by providing a uniform distribution of the multivalent metal ion throughout the silver halide crystallite or as a sufficient number of multivalent ions that are integrated only in the surface of the silver halide crystallites.

A wide variety of multivalent metal ions are contemplated by this invention including the alkaline earth ions, the transition metal ions including zinc, cadmium and mercury and the lanthanide and actinide elements. The multivalent metal ions are not limited to these elements and may also include other multivalent metal ions such as lead and bismuth; the only elements that tend to be of an unsatisfactory character are those that exist only in a monovalent state. Ions that activate the photochromic response are preferred, e.g., ions such as copper, iron, cadmium and the like. As noted previously, these multivalent ions are integrated into the surface of silver halide crystallite and serve as "handles" by which the organic capping agent is bonded to the silver halide crystallite.

In addition to the multivalent metal ions that serve as handles for bonding the organic capping agent to the silver halide crystallite, it is contemplated that photochromic activating or sensitizing agents may also be incorporated into the silver halide crystallite. Such activating or sensitizing agents include copper(I) ions, sulfide ions, thiosulfate ions, organosulfide ions, and/or mild reducing agents such as ascorbic acid and mixtures thereof.

As mentioned, the organic capping group bonds tightly to the multivalent metal ion "handles" to form a covering layer over each of the silver halide crystallites. The covering may be of a continuous or discontinuous character. Preferably the organic capping group is of the general formula $R_nY-$ where Y is an element selected from a group of elements consisting of the main group VA elements such as nitrogen and phosphorus and the main group VIA elements such as oxygen and sulfur, R is an organic group, and n has a value of one or two depending on whether Y is a pnictnide or a calcogen, it being understood that the calcogens would typically have one organic group bonded to it while the pnictnides may have one or two organic groups bonded to it. Preferably, Y is selected from a group of elements consisting of oxygen, nitrogen, phosphorous, and sulfur and more preferably sulfur is the element of choice because of the use of organosulfur compounds as photochromic activating or sensitizing agents.

R is an organic group or radical such as an alkyl, alkene, alkadiene, aryl, alkaryl and the like. Generally R is chosen to be of such a character so as to minimize undue interference with the Y to multivalent ion bond while providing a good covering or coating of the silver halide crystallite. As such, bulky, highly substituted organic radicals are to be avoided; straight-chain and unsubstituted or para-substituted aryl groups are preferred, preferably with less than about 12-15 carbon atoms. The organic radicals may be optionally substituted with nonreactive groups such as halides or with reactive groups, especially reactive groups capable of undergoing a polymerization reaction.

The organic groups should be compatible with the polymeric material with which they will be used. For example, acrylate and methylacrylate polymers, styrene polymers, polymers of acrylamide, vinyl halides such as poly(vinyl chloride); polymers of vinylidene halides such as poly-(vinylidene chloride); polymers of vinyl carbonate and vinyl alcohol, vinyl acetate, vinyl butyral; various aldehydes, such as oxymethylene, acetaldehyde; crotonaldehyde polymers of ethyleneoxide; cellulose polymers such as cellulose acetate butyrate, cellulose triacetate, and any other polymeric material with which the capped silver halide crystallite is compatible in an appropriate solvent, in the uncured polymer and in the solvent-free cured polymer. Further illustrations of thermoplastic resins useful in the practice of this invention are given in U.S. Pat. No. 3,576,755 all of which is incorporated herein by reference.

Additionally, the organic group R may itself have monomeric functionality such as that cited above for the polymeric matrix. Such functionality may be polymerized to form a crystallite homopolymer or it may be polymerized with other copolymerizable monomers to form copolymers. Examples of such copolymerizable monomers used to obtain copolymers are unsaturated alcohol esters, esters of saturated aliphatic and aromatic monobasic and polybasic acids, unsaturated ethers, unsaturated amides, N-substituted acrylamides, unsaturated ketones, and methylene malonic esters.

In essence, R may be defined as $-R^2-R^3-R^4$ where $R^2$ is an cyclic or acyclic structure of twelve of fewer carbon atoms that may be optionally substituted with halide radicals, where, when $R^2$ is a cyclic group, $R^3$ is a minimally substituted straight chain acyclic group in the "para" position of $R^2$, that is, opposite the bond to the multivalent ion, and having from 0 to 8 carbon atoms and $R^4$ is an optional functionality capable of being incorporated into a polymeric structure where such functionality includes, but is not limited to, ethylenic, isocyanate, alcohol, and acid functionality, that is, functionality polymerizable as urethanes, acrylics, polycarbonates, polyalkyl/butyral polymers and similar materials. This structure is illustrative only and is not intended to exclude other structures to which it is equivalent.

It has been found that a microemulsion technique is especially suitable for preparing the composition of this invention. Microemulsions are thermodynamically stable and optically isotropic solutions of water, hydrocarbons and at least one surfactant. The microemulsion system contemplated by the present invention is a system known as a reverse micelle process. In the reverse micelle process, a water core or nuclei is surrounded by the polar head groups of the surfactant. The non-polar portion of the surfactant extends into the non-polar hydrocarbon solvent solution thus forming the reverse micelle. When ionic materials are dissolved in the water used in the preparation of the reverse micelle, the ionic materials become encapsulated in the water core. Individual water cores which make up the reverse micelle solution are isolated from one another by the nonaqueous environment. An important factor which contributes to the size of a silver halide particle which is ultimately isolated from the reverse micelle is the amount of water present in each individual microemulsion. The size and shape of these microemulsions are dependent on the surfactant, solvents, the amounts of water and the dissolved ionic materials.

The size of the water core of the reverse micelles plays a role in producing suitably capped silver halide crystallites. The amount of water employed is most often expressed as a parameter "W" which is the ratio of the number of moles of water divided by the number of moles of sufactant used in a particular preparation. Even though amounts of water corresponding to a W value as high as 10 may be employed, it is preferred that the water be present in amounts less than $W=6$ and more preferably less than $W=5$. The amount of water present affects the size of the reverse micelles, as measured by the average micelle diameter. Preferably the size of the micelle is in the range of about 50–500 Å and more preferably in the smaller range of about 50–200 Å.

The surfactant employed in the present invention processes both polar and non-polar characteristics. Polar head groups of the surfactant occupy the interior of the reverse micelle while the hydrophobic hydrocarbon charge of the surfactant extends into the non-polar solvent. In the reverse micelle, the polar phase may or may not contain water. However, in the present invention the polar phase contains water in the core of the reverse micelle and is generally referred to as a water in oil, i.e., a water-in-hydrocarbon dispersion. The surfactant may be an anionic, non-ionic or cationic compound. Dialkyl sulfosuccinates are preferred anionic surfactant compounds with dioctyl sulfosuccinate (sodium salt) being the preferred surfactant. Even though the number of carbon atoms in the carbon series in the carbon chain is not particularly critical, anionic surfactants comprising about 6–20 carbon atoms in the carbon chains are preferred.

The surfactant may be present in the hydrocarbon microemulsion liquid medium in a concentration range of 0.1 to 1.0 moles per liter. Preferably, the surfactant is present in a concentration range of 0.3 to 0.7 moles per liter. The surfactant should also be present in a mole ratio range of water to surfactant (W value) of about 1 to 10 More preferably, the W value is about 2 to 6 as noted previously. The above concentration and ratio ranges are most preferred when an anionic surfactant is employed. Co-surfactants, i.e., a combination of one or more non-ionic, anionic, and/or cationic surfactants, are also contemplated by the present invention. Thus, the reverse micelle hydrocarbon microemulsion liquid medium comprising co-surfactants such as carboxylates or sulfonates and quaternary ammonium salts are contemplated by the present invention.

The hydrocarbon solvent employed in the present invention should not have any chemical reactivity with the other components of the solution and especially the capped silver halide crystallites. The hydrocarbon should have substantially non-polar characteristics so that the non-polar portion of the surfactant is readily soluble therein, while water, which forms the water core of the formed reverse micelle is substantially insoluble in the hydrocarbon. Hydrocarbons which are useful as solvents for the instant hydrocarbon microemulsion liquid system comprise aliphatic, noncyclic hydrocarbons such as hexane, heptane, octane, etc. and their branched isomers. Also, aliphatic cyclic hydrocarbons are contemplated by the present invention. Since the capped silver halide crystallites are ultimately removed from the micelle medium, it is preferred that the hydrocarbon solvent be readily volatile under finishing conditions. Thus hydrocarbon solvents in the 6–10 carbon range possess the generally preferred volatility characteristics.

Table 1 summarizes various data for a number of Examples that are subsequently described in detail. Examples I–XVII are illustrative of experiments showing the suitability of a capped silver halide crystallite as a photochromic composition suitable for incorporation into a plastic matrix. As a result of the many variables that seem to influence the results in these examples, a set of statistical design experiments was undertaken to determine the influence of the various variables. Table 2 summarizes the variable values used in the statistical design experiments. The general procedure of the statistical design experiments is outlined in Example XX. Examples XVIII and XIX provide details of the procedures employed after completion of the statistical design experiments. Further details of the methodology forming the basis of the statistical design experiments are found in a series of articles authored by G. C. Derringer in *Rubber World,* March, April, May and June, 1983.

In this type of experimental design, variables are changed in such a way that selected pairs of experiments can be found to isolate the effects of each individual variable. Thus, the pattern of results reveals the experimental conditions that give the best results. Table 2 summarizes the eight trial experiments with respect to the seven variables that were examined: silver nitrate concentration, sodium bromide concentration, copper- after a one-hour bleach in dark conditions. The percent change column expresses the photochromic response in terms of the percent increase or decrease from A to B and from B to C.

TABLE 1
DATA SUMMARY FOR EXAMPLES I-XIX

| EXAMPLE | $Ag^+$ ml 1.0 M | $Cu^{++}$ ml 1.0 M | Other ml 1.0 M | $Br^-$ ml 1.0 M | ml Cap Agent | Solubility** | Photochromism** |
|---------|-----|-----|-----|-----|-----|-----|-----|
| I | .2 | | | .4 | .4 PhSH | 4 | 5 $CHCl_3$ |
| II | .4 | .2 | | .2 | .4 PhSH | 2 | 2 |
| III | .2 | .2 | | .4 | .4 PhSH | 4 | 2 |
| IV | .2 | .2 | | .4 | .4 PhSH | 4 | 2 |
| V | .2 | .1 (2 drops) | | .4 | .2 PhSH | 3 | 1 |
| VI | .2 | .02 | | .4 | .4 PhSH | 4 | 1 |
| VII | .2 | .02 | | .4 | .4 PhSH | 3 | 1 |
| VIII | .2 | .02 | | .4 | .4 PhSH | 3 | 1 |
| IX | .2 | .02 | | .0004 | .4 PhSH | 3 | 4 |
| X | .2 | | .02 $Zn^{++}$ | .4 | .4 PhSH | 3 | 2 |
| XI | .2 | | .02 $Zn^{++}$ | .4 | .4 PhSH | 4 | 1 |
| XII | .2 | | .02 $Zn^{++}$ | .3 | .4 PhSH | 3 | 2 |
| XIII | .2 | .1 (2 drops) | | .4 | .2 —$NH_2$* | 3 | 1 |
| XIV | .4 | .04 | | .2 | .4 —$NH_2$* | 4 | 1 |
| XV | .3 | .03 | | .2 | .2 —$NH_2$* | 5 | 1 |
| XVI | .2 | .02 | | .4 | .4 —$NH_2$* | 3 | 1 |
| XVII | .2 | .02 | | .4 | .4 —$NH_2$* | 4 | 5 |
| XVIII | .2 | .02 | | .4 | .2 PhSH | 6 | 4 |
| XIX | .2 | .02 | 0.2 $Zn^{++}$ | .2 | .2 PhSH | 4 | 4 Py |

*—$NH_2$ = 2-thiophenylmethylamine
**Solubility/Photochromism Scale: 1 Very Slight; 2 Slight; 3 Some; 4 Good; 5 Very Good; 6 Excellent

TABLE 2
SUMMARY OF STATISTICAL DESIGN EXPERIMENTS[a]

| SAMPLE | VARIABLES[b] | | | | | | | PHOTOCHROMISM | | ABSORBANCE[c] | | | % CHANGE[d] | |
| | $AgNO_3$ | NaBr | $Cu(NO_3)_2$ | AgBr Stir Time | PhSH | Capped AgBr Stir Time | Pyridine Stir Time | Pyridine | $CHCl_3$ | A | B | C | A, B | B, C |
|---|---|---|---|---|---|---|---|---|---|---|---|---|---|---|
| 1 | − | − | − | + | + | + | − | − | − | 0.27 | 0.24 | 0.22 | −11.1 | −8.3 |
| 2 | − | − | + | + | − | − | + | − | − | 0.28 | 0.28 | — | 0.0 | — |
| 3 | − | + | − | − | + | − | + | + | − | 0.21 | 0.25 | 0.23 | 19.0 | −8.0 |
| 4 | − | + | + | − | − | + | + | + | − | 0.25 | 0.35 | 0.27 | 40.0 | −22.9 |
| 5 | + | − | − | − | − | + | + | − | − | 0.14 | 0.13 | 0.13 | −7.1 | 0.0 |
| 6 | + | − | + | − | + | − | − | − | − | 0.28 | 0.26 | 0.26 | −7.1 | 0.0 |
| 7 | + | + | − | + | − | − | − | − | − | 0.21 | 0.20 | 0.20 | −4.8 | 0.0 |
| 8 | + | + | + | + | + | + | + | − | − | 0.24 | 0.23 | — | −4.2 | — |

[a]The general procedure for these experiments is outlined in Example XX.
[b] "−" = Low Value     "+" = High Value
$AgNO_3$ = 0.2 ml of 1.0 M     0.4 ml of 1.0 M
NaBr = 0.2 ml of 1.0 M     0.4 ml of 1.0 M
$Cu(NO_3)_2$ = 0.01 ml of 1.0 M     0.02 ml of 1.0 M
AgBr stir time = 30 min     2.5 hrs
Thiophenol = 0.2 ml     0.4 ml
Capping stir time = 2 hrs     16 hrs
Pyridine stir time = 1 hr     72 hrs
[c]Absorbance at 500 nm; A = prior to irradiation; B = typically after 1 minute of irradiation with unfiltered 150 W high-pressure xenon arc lamp; C = typically after 1 hr bleach period in dark.
[d]Percent change defined as: % (A, B) = 100* (B-A)/A; % (B, C) = 100* (C-B)/B.

(II) nitrate hydrate concentration, silver bromide stir time, thiophenol concentration, "capped" silver bromide stir time, and silver bromide powder-pyridine stir time. A "+" represents a high concentration in the case of reagent addition and increased stirring time for "stir time" variables, while a "−" represents low concentration in the case of reagent addition, and decreased stirring time for "stir time" variables. The photochromism column indicates the success each silver bromide capped powder displayed in either pyridine or chloroform; a "+" defines a successful and a "−" defines an unsuccessful photochromic response. Absorbance at 500 nm is another measure of the photochromic response of the sample, as follows: (A) immediately after the sample was stirred and filtered under dark room conditions prior to moderation; (B) immediately after a one minute xenon light exposure; and (C) immediately after a one-hour bleach in dark conditions.

TABLE 3
PHOTOCHROMIC CYCLE STUDY IN PYRIDINE

| Cycle Number | Irradiation Time | Photochromic Response Absorption 500 nm | Bleaching Time | Bleaching Response Absorption 500 nm |
|---|---|---|---|---|
| 1 | 15 sec | 0.170–0.215 | 60 min | 0.215–0.155 |
| 2 | 15 sec | 0.110–0.180 | 15 min | 0.180–0.115 |
| 3 | 10 sec | 0.115–0.162 | 10 min | 0.162–0.120 |
| 4 | 5 sec | 0.120–0.152 | 5 min | 0.152–0.125 |
| 5 | 15 sec | 0.125–0.145 | 15 min | 0.145–0.120 |
| 6 | 30 sec | 0.120–0.132 | 60 min | 0.132–0.122 |
| 7 | 15 sec | 0.122–0.138 | 120 min | 0.138–0.123 |

Sample 4 from the statistical design experiments (Example XX; Table 2) was selected for a series of experiments to determine 1) the time required to darken the sample, 2) the time to bleach the darkened sample to its original state, and 3) to determine the effect of darkening and bleaching cycles. Table 3 provides a summary of the xenon light exposure times, bleaching times, and photochromic response as measured by the absorbance at 500 nm, immediately after light exposure and again 5 minutes to 120 minutes after light exposure (bleaching time).

Examples XVIII and XIX provide additional data for experiments conducted after the statistical design experiments of Example XX. Example XXI illustrates the use of a capped silver halide crystallite in a polycarbonate matrix. It is noted that this experiment demonstrates the ability to incorporate materials of the present invention into a polymer matrix and it shows that a multivalent ion is necessary to provide an adequate bond to the capping since without the multivalent ion, the resulting polymer matrix has a slow bleaching time.

EXAMPLE I

Reverse micelles of silver nitrate were prepared by adding 0.2 ml of $AgNO_3$ (1.0M) in 2.0 ml of $H_2O$ to a 50 ml solution of a 0.5M dioctyl sulfosuccinate ("aerosol OT" or "AOT") in heptane. The addition was carried out with rapid stirring; the stirring was continued until the resulting solution had a clear brown color. A reverse micelle solution of sodium bromide was prepared by adding 0.4 ml of 1.0M NaBr in 2.0 ml of $H_2O$ to 50 ml of a 0.5M AOT/heptane solution. The sodium bromide was added with rapid stirring and the stirring was continued until the solution is clear. The sodium bromide reverse micelle solution was then slowly added to the silver nitrate reverse micelle solution with vigorous stirring (appearance of a vortex using a magnetic stirrer), and stirred vigoursly for a period of about one hour.

About 0.2 ml of silver nitrate in 2.0 ml of $H_2O$ was added slowly and with vigorous stirring to the solution resulting from the addition of the sodium bromide reverse micelles to the silver nitrate reverse micelles. The resulting solution was slightly cloudy. The almost colorless solution turned yellow-brown after about half of an hour. Sodium bromide (0.4 ml) in 2.0 ml of $H_2O$ was added slowly to the yellow-brown solution with vigorous stirring. No initial color change was observed. Within fifteen minutes large particles of precipitate were visible Thiophenol (0.4 ml in heptane) was then added.

EXAMPLE II

A reverse micelle solution of silver nitrate was prepared by adding 0.4 ml of 1.0M silver nitrate in 2.0 ml of $H_2O$ to 50 ml of a 0.5M AOT/heptane solution. The resulting solution was stirred until clear—the solution having a slight brownish color. A second reverse micelle solution of sodium bromide was prepared by adding 0.2 ml of sodium bromide (1.0M) and 2.0 ml of $H_2O$ to 50 ml of 0.5M AOT/heptane. The resulting solution was stirred until clear. A third reverse micelle solution of copper ion was prepared by adding 0.2 ml of $Cu(NO_3)_2 \cdot xH_2O$ (1.0M) in 2.0 ml of $H_2O$ to 50 ml of a 0.5M AOT/heptane solution. The resulting solution was stirred until clear—the solution having a faint blue color. The reverse micelle solution of sodium bromide was added slowly with stirring to the reverse micelle solution of silver nitrate. The resulting solution was stirred until clear. The reverse micelle solution of copper nitrate was then added to the reverse micelle solution of silver nitrate and sodium bromide with stirring. The resulting solution was stirred until clear. A solution of 0.4 ml of thiophenol in 2.0 ml of heptane was added slowly with vigorous stirring. The solution became turbid.

EXAMPLE III

A reverse micelle solution of silver nitrate was prepared by adding 0.2 ml of 1.0M $AgNO_3$ in 2.0 ml of $H_2O$ to 50 ml of 0.5M AOT/heptane with stirring. Stirring was continued until the solution was clear. A second reverse micelle solution of sodium bromide was prepared by adding 0.4 ml of 1.0M NaBr in 2.0 ml of $H_2O$ to 50 ml of 0.5M AOT/heptane with stirring. The solution was stirred until clear. A third solution of copper nitrate was prepared by slowly adding 0.2 m of 1.0M $Cu(NO_3)_2 \cdot 2.5\ H_2O$ to 2.0 ml of $H_2O$ and then adding the resulting solution slowly to 50 ml of 0.5M AOT/heptane. The resulting solution was stirred until clear. The reverse micelle solution of sodium bromide was added to the reverse micelle solution of silver nitrate with vigorous stirring. The stirring was continued until the solution was clear, i.e., about one hour. The reverse micelle solution of copper nitrate was then added to the solution resulting from the addition of the sodium bromide to silver nitrate reverse micelles. The addition was carried out with vigorous stirring and stirring was continued until the solution was clear. The solution was observed to then take on a slightly cloudy cast. A solution of 0.4 ml of thiophenol in 4.0 ml of heptane was added to the resulting preparation. The solution became a turbid light yellow almost immediately.

The resulting light yellow turbid solution was centrifuged at 10,000 rpm for about thirty minutes. The supernatant liquid was decanted and the remaining precipitate was washed with heptane. The heptane-precipitate was allowed to stand until a good suspension was obtained. The suspension was utlracentrifuged again. The supernatant liquid was decanted and the resulting precipitate was air-dried. During the workup, the precipitate remained a yellowish color with slow settling of larger particles leaving a yellow supernatant liquid.

Three ml of pyridine was added to the air-dried silver and copper bromide air-dried product. The product dissolved almost immediately. Although the solution was not crystal clear, no material settled out on standing overnight. Transmission electron micrographs of the capped particles indicated that the particle sizes were approximately 30–80 Å.

EXAMPLE IV

The procedure of Example III was repeated. No cloudiness was observed on adding the copper nitrate reverse micelle to the reverse micelle of silver bromide crystallites. The addition of 0.4 ml of thiophenol in 2.0 ml of heptane resulted in the solution becoming yellow and turbid. The precipitate was worked up as before. The dried silver bromide/copper nitrate material was not a free flowing powder.

EXAMPLE V

A reverse micelle solution of copper and silver ions was prepared by adding 0.2 ml of 1.0M $AgNO_3$ and two drops of 1.0M $Cu(NO_3)_2 \cdot 2.5\ H_2O$ in 2.0 ml of $H_2O$ to 50 ml of AOT/heptane (0.5M) with rapid stirring. The solution was stirred until clear, the solution being a light brown in color. A reverse micelle of sodium bromide was prepared by rapidly 0.4 ml of 1.0M NaBr in 2.0 ml of H$_2$O to 0.5M AOT/heptane (50 ml) with rapid stirring. Stirring was continued until the solution was clear. The reverse micelle solution of sodium bromide was added slowly to the reverse micelle solution of silver nitrate and copper nitrate with vigorous stirring. The solution was stirred for about one hour. After thirty minutes of stirring, the solution became colorless.

A thiophenol solution of 0.2 ml of PhSH in 4.0 ml of heptane was added slowly with vigorous stirring to the preceding colorless solution The resulting solution became immediately turbid. Initially, the turbid solution was greenish and changed to yellowish by the time all of the thiophenol had been added.

EXAMPLE VI

A reverse micelle solution of silver and copper ions was prepared by slowly adding 0.2 ml of 1.0M AgNO$_3$ in 2.0 ml of H$_2$O to 50 ml of a 0.5M AOT/heptane solution with vigorous stirring. A solution of copper nitrate was prepared by adding 0.2 ml of a 1.0M Cu(NO$_3$)$_2$.2.5H$_2$O to 2.0 ml of H$_2$O and adding it to the silver nitrate reverse micelles. The solution was stirred for one hour. A second reverse micelle solution of sodium bromide was prepared by slowly adding 0.4 ml of 1.0M NaBr in 2.0 ml of H$_2$O with vigorous stirring to 50 ml of a 0.5M AOT/heptane solution. The resulting solution was stirred for an hour.

The micelle solution of sodium bromide was added slowly to the silver and copper micelle solution with vigorous stirring. A clear brownish solution resulted after stirring overnight. After twenty four hours, the solution became turbid and a darker brown. A solution of 0.4 ml of thiophenol in 4.0 ml of heptane was added to the preceding solution and stirred for about four hours. The workup is the same as in example III except that prior to the second ultracentrifugation, the silver bromide/heptane solution was ultrasonicated to help break up the larger agglomerates of the silver bromide crystallites.

EXAMPLE VII

A silver nitrate reverse micelle was prepared by slowly adding 0.2 ml of 1.0M AgNO$_3$ in 2.0 ml of H$_2$O to 50 ml of 0.5M AOT/heptane with rapid stirring. A solution of 0.2 ml of 1.0M Cu(NO$_3$)$_2$.2.5H$_2$O in 2.0 ml of H$_2$O was added to the silver nitrate reverse micelle and stirred for one hour. The resulting solution was a clear brownish color. A second sodium bromide reverse micelle solution was prepared by slowly adding 0.4 ml of NaBr in 2.0 ml of H$_2$O to 50 ml of 0.5M AOT/heptane with rapid stirring. Stirring was continued for about one hour. The second reverse micelle solution of sodium bromide was added slowly to the silver and copper reverse micelle solution with vigorous stirring. The resulting solution was stirred for about one hour and became almost colorless after about 30 minutes/ The colorless solution was added to 0.4 ml of thiophenol in 4.0 ml of heptane. The solution was stirred overnight. The resulting precipitate was worked up as described in Example VI.

EXAMPLE VIII

A copper-silver reverse micelle microemulsion liquid medium was prepared by adding 0.2 ml of 1.0M Cu(NO$_3$)$_2$.2.5H$_2$O in 2.0 ml of H$_2$O to 50 ml of 0.5M AOT/heptane with rapid stirring. This was followed by the addition of a solution of 0.2 ml of 1.0M AgNO$_3$ in 2.0 ml of H$_2$O to the same 50 ml AOT/heptane solution. A second bromide reverse micelle solution was prepared by adding 0.4 ml of 1.0M NaBr in 2.0 ml of H$_2$O to 0.5M AOT/heptane with rapid stirring. Stirring was continued until the solution was clear, i.e., approximately one hour. The bromide reverse micelle solution was added slowly to the copper/silver reverse micelle solution with rapid stirring. The solution became almost colorless after about one hour of stirring. A thiophenol solution of 0.4 ml of PhSH in 4.0 ml of heptane was added to the clear solution and stirred overnight. On addition of the thiophenol, there was an immediate yellow turbidity. The yellow turbidity acquired a reddish tint after overnight stirring. As with Example VI, the larger agglomerates were broken up with ultrasonication during the workup in the resulting product.

EXAMPLE IX

A silver and copper reverse micelle microemulsion liquid medium was prepared by slowly adding 0.2 ml of 1.0M AgNO$_3$ in 2.0 ml of H$_2$O to 50 ml of 0.5M AOT/heptane with vigorous stirring. A 10% solution (100 per liters of 1.0M Cu(NO$_3$)$_2$ in 900 microliters of H$_2$O) of Cu(NO$_3$)$_2$.2.5H$_2$O was prepared and 100 microliters was added to the silver nitrate/AOT solution with rapid stirring. No precipitate or color change in the brownish colored solution was noticed.

A bromide-containing microemulsion liquid medium was prepared by slowly adding 0.4 ml of 1.0M NaBr in 2.0 ml of H$_2$O to 50 ml of AOT/heptane solution with rapid stirring. The solution was stirred until clear. The reverse micelle solution of bromide was added to the reverse micelle solution of copper and silver ions with vigorous stirring. No precipitate or color change was noticed in the brown solution. The solution was stirred for about one hour. A thiophenol solution (0.4 ml in 4.0 ml of heptane) was added with rapid stirring. The solution became turbid and changed to a yellow color. The turbid yellow solution was stirred for approximately four days prior to work up.

The resulting precipitate was worked up by ultracentrifuging at 10,000 rpm for thirty minutes. The supernatant liquid was decanted and the remaining precipitate was washed with an equal amount of heptane. The washed solution was ultracentrifuged and the supernatant liquid was decanted. The remaining precipitate was allowed to air-dry.

EXAMPLE X

A silver-zinc reverse micelle microemulsion liquid medium was prepared by slowly adding 0.2 ml of a 1.0M AgNO$_3$ in 2.0 ml of H$_2$O to 50 ml of 0.5M AOT/heptane with rapid stirring followed by the addition, with rapid stirring, of 0.2 ml of a 1.0M Zn(NO$_3$)$_2$.xH$_2$O in 2.0 ml of H$_2$O. The resulting solution was stirred until clear. The second reverse micelle microemulsion liquid medium of sodium bromide was prepared by slowly adding 0.4 ml of 1.0M NaBr in 2.0 ml of H$_2$O to 50 ml of 0.5M AOT/heptane with rapid stirring. Stirring was continued until the resulting solution was clear. The bromide microemulsion was slowly added to the silver-zinc microemulsion with vigorous stirring. The stirring was continued for one hour and the solution became a clear light brown color. The clear light brown solution was added to a thiophenol solution of 0.4 ml of PhSH in 4.0 ml of heptane slowly while stirring vigorously. The solution was stirred overnight. The solution initially was a turbid yellowish color; however, the following day, the precipitate had turned a brownish color.

The resulting precipitate was worked up by ultracentrifuging at 10,000 rpm followed by washing with heptane, ultrasonication, ultracentrifugation at 10,000 rpm, decantation of supernatant liquid and air-drying of the solid product.

EXAMPLE XI

A silver-zinc containing water-in-hydrocarbon microemulsion liquid medium was prepared by slowly adding 0.2 ml of 1.0M $AgNO_3$ in 2.0 ml of $H_2O$ to 50 ml of 0.5M AOT/heptane with rapid stirring. This microemulsion was added to 0.2 ml of 1.0M $Zn(NO_3)_2.6H_2O$ in 2.0 ml of $H_2O$ and stirred for an hour. A second, bromide-containing water-in-hydrocarbon microemulsion liquid medium was prepared by slowly adding 0.4 ml of 1.0M NaBr in 2.0 ml of $H_2O$ to 50 ml of 0.5M AOT/heptane with stirring. The resulting solution was also stirred for an hour.

The bromide containing microemulsion was added slowly to the silver-zinc containing microemulsion with vigorous stirring. The solution was stirred for two hours. To this solution was added a thiophenol solution of 0.4 ml of PhSH in 4.0 ml of heptane. The solution turned a yellow color and on stirring overnight took on a reddish brown cast. The work up of the resulting precipitate was the same as described in Example X.

EXAMPLE XII

A silver-containing microemulsion medium was prepared by slowly adding 0.2 ml of 1.0M $AgNO_3$ in 2.0 ml of $H_2O$ to 0.5M AOT/heptane (50 ml) with rapid stirring. The solution was stirred until it had a clear brownish color. A second bromide-containing microemulsion liquid medium was prepared by slowly adding 0.4 ml of 1.0M NaBr in 2.0 ml of $H_2O$ to 50 ml of 0.5M AOT/heptane with rapid stirring. The solution was stirred until clear. A third zinc-containing microemulsion liquid medium was prepared by slowly adding 0.2 ml of 1.0M $Zn(NO_3)_2.x H_2O$ in 2.0 ml of $H_2O$ to 50 ml of 0.5M AOT/heptane with rapid stirring. The solution was stirred until clear.

The bromide-containing microemulsion liquid medium was added slowly to the silver-containing microemulsion liquid medium with stirring. The mixture was stirred for one hour and turned a brown color with a slight haze. This solution was added to the zinc-containing microemulsion liquid medium with vigorous stirring. The solution was stirred for one hour. A thiophenol solution of 0.4 ml of PhSH in 4.0 ml of heptane was added in a single portion. The solution became a turbid yellow color and was stirred overnight.

The turbid solution was worked up by ultracentrifuging at 10,000 rpm for 30 minutes. The supernatant liquid was decanted and the remaining solid washed with an equal amount of heptane. This mixture was again ultracentrifuged, the supernatant liquid decanted and the remaining solid allowed to air-dry.

EXAMPLE XIII

A silver and copper-containing water-in-hydrocarbon microemulsion liquid medium was prepared by slowly adding 0.2 ml of a 1.0M $AgNO_3$ in 2.0 ml of $H_2O$ and two drops of a 1.0M $Cu(NO_3)_2.2.5 H_2O$ to 50 ml of a 0.5M AOT/heptane solution with rapid stirring. The resulting solution was a light brown color. A bromide-containing water-in-hydrocarbon microemulsion liquid medium was prepared by adding 0.4 ml of a 1.0M NaBr in 2.0 ml of $H_2O$ to 50 ml of a 0.5M AOT/heptane solution with rapid stirring. The solution was stirred until clear in color. The bromide-containing microemulsion liquid medium was slowly added to the silver and copper-containing microemulsion liquid medium with vigorous stirring. The resulting solution was stirred for one hour. For approximately thirty minutes, the light brown silver/copper-containing microemulsion liquid medium became a colorless solution. To the colorless solution was slowly added a 0.2 ml of 2-thiophenylmethylamine in 4.0 ml of heptane with vigorous stirring. The solution immediately turned a turbid, light green and then a light yellow. The solution was stirred overnight. The product had large precipitate particles with a greenish tint.

The work up of the resulting product was the same as that described in Example VI.

EXAMPLE XIV

A silver and copper-containing water-in-hydrocarbon microemulsion liquid medium was prepared by slowly adding 0.4 ml of a 1.0M $AgNO_3$ in 2.0 ml of $H_2O$ to 50 ml of a 0.5M AOT/heptane solution with rapid stirring. To this was then added a 0.4 ml of a 1.0M $Cu(NO_3)_2.2.5 H_2O$ in 2.0 ml of $H_2O$ solution with stirring. Stirring was continued for 1.5 hours. The resulting solution was a dark brown. A second bromide-containing water-in-hydrocarbon microemulsion liquid medium was prepared by slowly adding 0.2 ml of a NaBr (1.0M) in 2.0 ml of a $H_2O$ to 50 ml of a 0.5M AOT/heptane solution with rapid stirring. The solution was stirred for 1.5 hours and was colorless.

A bromide-containing microemulsion liquid medium was slowly added to the silver and copper microemulsion liquid medium with vigorous stirring. The stirring continued for 2 hours. To this solution was added 0.4 ml of 2-thio-phenylmethylamine in 4.0 ml of heptane with vigorous stirring. The solution was stirred for approximately 72 hours. The work up of the resulting product is the same as that described in Example VI.

EXAMPLE XV

A silver and copper-containing water-in-hydrocarbon microemulsion liquid medium was prepared by slowly adding 0.3 ml of a 1.0M $AgNO_3$ in 2.0 ml of $H_2O$ to 50 ml of a 0.5 M AOT/heptane solution with rapid stirring. To this medium was added 0.3 ml of a 1.0M $Cu(NO_3)_2.5H_2O$ with rapid stirring. Stirring was continued until the solution was a clear brown color. A second bromide-containing water-in-hydrocarbon microemulsion liquid medium was prepared by slowly adding 0.2 ml of 1.0M NaBr in 2.0 ml of $H_2O$ to 50 ml of a 0.5M AOT/heptane solution with rapid stirring. The solution was stirred until clear.

The bromide-containing water-in-hydrocarbon microemulsion liquid medium was slowly added to the silver and copper containing water-in-hydrocarbon liquid medium with vigorous stirring. The solution was stirred for 1 hour and was slightly cloudy. To the slightly cloudy solution was added 0.2 ml of 2-thiophenylmethylamine in 4.0 ml of a heptane solution with vigorous stirring. The work up of the product is the same as given in Example VI.

EXAMPLE XVI

A silver and copper-containing water-in-hydrocarbon microemulsion liquid medium was prepared by slowly adding 0,2 ml of a 1.0M AgNO$_3$ in 2.0 ml of H$_2$O to a 50 ml of a 0.5M AOT/heptane solution with rapid stirring. To this was added 0.2 ml of a 1.0M Cu(NO$_3$)$_2$.2.5H$_2$O in 2.0 ml of H$_2$O. The resulting solution was stirred until it had a clear brown color. A second bromide-containing water-in-hydrocarbon microemulsion liquid medium was prepared by slowly adding 0.4 ml of a 1.0M NaBr in 2.0 ml of H$_2$O to 50 ml of a 0.5M AOT/heptane solution with rapid stirring. The solution was stirred until clear.

The bromide-containing water-in-hydrocarbon microemulsion liquid medium was added to the silver and copper-containing water-in-hydrocarbon microemulsion liquid medium with vigorous stirring for one hour. The light brown color became almost colorless. To this was added 0.4 ml of 2-thiophenemethylamine in 4.0 ml of heptane with vigorous stirring. The resulting solution was stirred overnight. The work up of the resulting product was the same as that given in Example VI.

EXAMPLE XVII

The heptane washings of Example XVI were noted to contain fine particles of unsettled precipitate. These were allowed to settle out overnight and worked up in the same manner as the initial precipitate.

EXAMPLE XVIII

A reverse micelle solution of silver and copper ions was prepared by adding 0.2 ml of 1.0M AgNO$_3$ in 2.0 ml of H$_2$O to 50 ml of an AOT/heptane (0.5M) solution with rapid stirring. Then a solution of 0.2 ml of 1.0M Cu(NO)$_2$.2.5H$_2$O in 2.0 ml of H$_2$O was rapidly added with stirring to the AOT/heptane silver nitrate reverse micelle solution.

A bromide reverse micelle solution was prepared by slowly adding 0.4 ml of 1.0M NaBr in 2.0 ml of H$_2$O to 50 ml of 0.5M AOT/heptane with rapid stirring. The reverse micelle solution of bromide was added to the reverse micelle solution of silver and copper ions with vigorous stirring. The resulting solution was stirred for about an hour. The resulting reverse micelle solution of silver-copper bromide crystallites was placed in a 250 ml separatory funnel and added dropwise (about one drop every five seconds) to 50 ml of an AOT/heptane solution containing 0.2 ml in 4.0 ml of heptane thiophenol with rapid stirring.

EXAMPLE XIX

A silver, copper and zinc-containing water-in-hydrocarbon microemulsion liquid medium was prepared by slowly adding 0.2 ml of a 1.0M AgNO$_3$ in 2.0 ml of H$_2$O to 50 ml of a 0.5M AOT/heptane solution with rapid stirring. This microemulsion was also added to 0.2 ml of a 1.0M Cu(NO$_3$)$_2$.5 H$_2$O in 2.0 ml of H$_2$O and 0.2 ml of a 1.0M Zn(NO$_3$)$_2$.6 H$_2$O. A second bromide-containing water-in-hydrocarbon microemulsion liquid medium was prepared by slowly adding 0.2 ml of a 1.0M NaBr in 2.0 ml of H$_2$O to 50 ml of a 0.5M AOT/heptane solution with rapid stirring.

The bromide-containing water-in-hydrocarbon microemulsion liquid medium was slowly added to the silver, copper and zinc-containing water-in-hydrocarbon microemulsion liquid medium with vigorous stirring. The resulting mixture was stirred for two and a half hours. The solution was dark brown and cloudy. To the dark brown cloudy solution was added a thiophenol solution of 0.2 ml of PhSH in 4.0 ml of heptane with vigorous stirring. The solution was slightly yellow and was stirred for about seventy-two hours. The work up was the same as that described in Example VI.

EXAMPLE XX

In carrying out a set of statistical design experiments detailed in Table 2, the following general procedure was used:

Solution A was formed by slowly adding the appropriate amount of 1.0M AgNO$_3$ in 2.0 ml of H$_2$O to 50 ml of a rapidly stirred 0.5M AOT/heptane solution; then to this solution, while maintaining stirring, the appropriate amount of 1.0M Cu(NO$_3$)$_2$.2.5 H$_2$O solution was added. The resulting mixture was stirred until clear, usually about 15 minutes.

Solution B was prepared by adding the appropriate amount of 1.0M NaBr in 2.0 ml H$_2$O to 50 ml of a0.5M amount AOT/heptane solution with rapid stirring. Stirring was continued until the solution was clear, i.e., about 15 minutes. Solution B was slowly added to solution A with vigorous stirring. Stirring was maintained for approximately 30 minutes. The appropriate amount of thiophenol in 4.0 ml of heptane was added slowly to the AB solution with vigorous stirring. Stirring was continued for 16 hours during which time the solution became turbid as the capped product precipitated.

The turbid solution was centrifuged at 10,000 rpm for 30 minutes. The AOT/heptane supernate was decanted and the precipitate washed four times with heptane, centrifuging at 10,000 rpm for 30 minutes and decanting the heptane each time. The solid product was dried with nitrogen or air prior to dissolving in pyridine or other solvents. To evaluate the photochromic response, 2 mg of the dry powder was added to 2 g of pyridine or other solvent and stirred for the appropriate amount of time (1–72 hours). The resulting 0.1% (w/w) was filtered through a Millipore 0.5 μm Millex SR syringe filter into an irradiation cell or spectroscopic cuvette.

EXAMPLE XXI

A portion of the product obtained from Example I was dissolved in chloroform and added to a chloroform solution of Mobay FCR-2405 ® polycarbonate (a polycarbonate having a molecular weight range of about 25,000 to 27,000). A clear transparent film of this solution, deposited on a glass microscope slide was initially colorless, but darkened when exposed for 1 minute to an Eimac 150-W high-pressure xenon arc lamp. The bleaching process was slow.

It is to be understood that although the present invention has been specifically disclosed with the preferred embodiment and examples, modifications to the experimental design may be apparent to those skilled in the art and such modifications and variations are considered to be within the scope of the invention and the appended claims. It is also intended that all matter contained in the above description shall be interpreted as illustrative and not in a limiting sense, the scope of the invention being indicated by the appended claims rather than by the foregoing description: thus all changes that come within the meaning and range of equivalency of the claims are therefore intended to be embraced therein. That is, the following claims are intended to cover all of the generic and specific features of the invention herein described, and all statements of the scope of the invention which, as a matter of langugage, fall therebetween. Furthermore, it is to be understood that in the following claims, ingredients or compounds recited in the singular are intended to include compatible mixtures of such ingredients wherever the sense permits.

We claim:

1. A photochromic composition for incorporation into a light-transmitting polymer consisting essentially of:
   a. silver halide crystallites;
   b. an organic capping group; and
   c. multivalent metal ions
      1) integrated into the surface of said silver halide crystallite; and
      2) of a sufficient number to provide surface sites on each of said silver halide crystallites so as to be bonded to said organic capping group so that said organic capping group forms a capping layer covering each of said silver halide crystallites to give capped silver halide crystallites that:
         a) have a size that is less than the minimum Rayleigh scattering size; and
         b) are isolated as a free-flowing powder that is soluble in organic solvents.

2. The photochromic composition as recited in claim 1 wherein said silver halide is selected from the group consisting of AgCl, AgBr, AgI, and mixtures thereof.

3. The photochromic composition as recited in claim 2 wherein said silver halide is AgBr.

4. The photochromic composition as recited in claim 1 wherein said size of said capped silver halide crystallites is less than about 1000 Å.

5. The photochromic composition as recited in claim 4 where said size of said capped silver halide crystallites is less than about 200 Å.

6. The photochromic composition as recited in claim 5 wherein said size of said silver halide crystallites is less than about 100 Å.

7. The photochromic composition as recited in claim 1 wherein said multivalent metal ion is a transition metal.

8. The photochromic composition as recited in claim 7 wherein said transition metal ion is a divalent ion.

9. The photochromic composition as recited in claim 8 wherein said divalent ion is a divalent ion selected from the group of ions consisting of copper and zinc ions.

10. The photochromic composition as recited in claim 9 wherein said divalent ion is copper.

11. The photochromic composition as recited in claim 1 wherein said organic capping group is of the general formula $R_nY^-$ where Y is an element selected from the group of elements consisting of the main group VA elements and main group VIA elements, R is an organic group, and n has a value of 1 or 2.

12. The photochromic composition as recited in claim 11 where Y is an element selected from the group of elements consisting of oxygen, nitrogen, phosphorus, and sulfur.

13. The photochromic composition as recited in claim 12 where Y is sulfur.

14. The photochromic composition as recited in claim 11 where R is a group selected from the group consisting of optionally substituted alkyl, alkene, alkadiene, aryl, and alkaryl groups.

15. The photochromic composition as recited in claim 14 where the R is an optionally substituted aryl group.

16. The photochromic composition as recited in claim 15 where R is an optionally substituted phenyl group.

17. The photochromic composition as recited in claim 16 where R is a phenyl group.

18. The photochromic composition as recited in claim 11 where R contains at least one polymerizable group.

19. The photochromic composition as recited in claim 18 wherein said polymerizable group is an ethylenic group.

20. The photochromic composition as recited in claim 18 wherein said polymerizable group is a functional group capable of forming a condensation polymer.

21. The photochromic composition as recited in claim 1 wherein said photochromic composition is soluble in organic solvents.

22. The photochromic composition as recited in claim 21 wherein said photochromic composition is soluble in a solvent selected from the group of solvents consisting of hydrocarbon solvents, halocarbon solvents, aromatic solvents, heterocyclic solvents and mixtures thereof.

23. The photochromic composition as recited in claim 22 wherein said photochromic composition is soluble in a solvent selected from the group of solvents consisting of chloroform, methylene chloride, tetrachloroethane, pyridine and mixtures thereof.

24. The photochromic composition as recited in claim 23 wherein said solvent is pyridine.

25. The photochromic composition as recited in claim 21 wherein said solvent is a reactive monomer.

* * * * *